United States Patent
Jiang et al.

(10) Patent No.: US 11,445,198 B2
(45) Date of Patent: Sep. 13, 2022

(54) MULTI-QUALITY VIDEO SUPER RESOLUTION WITH MICRO-STRUCTURED MASKS

(71) Applicant: TENCENT AMERICA LLC, Palo Alto, CA (US)

(72) Inventors: Wei Jiang, Sunnyvale, CA (US); Wei Wang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/335,535

(22) Filed: Jun. 1, 2021

(65) Prior Publication Data
US 2022/0103823 A1   Mar. 31, 2022

Related U.S. Application Data

(60) Provisional application No. 63/084,788, filed on Sep. 29, 2020.

(51) Int. Cl.
| | |
|---|---|
| *H04N 19/132* | (2014.01) |
| *H04N 19/176* | (2014.01) |
| *H04N 19/59* | (2014.01) |
| *G06N 3/04* | (2006.01) |
| *H04N 19/147* | (2014.01) |

(52) U.S. Cl.
CPC ............ *H04N 19/132* (2014.11); *G06N 3/04* (2013.01); *H04N 19/147* (2014.11); *H04N 19/176* (2014.11); *H04N 19/59* (2014.11)

(58) Field of Classification Search
None
See application file for complete search history.

(56) References Cited

U.S. PATENT DOCUMENTS

| | | |
|---|---|---|
| 2011/0274366 A1 | 11/2011 | Tardif |
| 2020/0167943 A1 | 5/2020 | Kim et al. |

FOREIGN PATENT DOCUMENTS

| | | | | |
|---|---|---|---|---|
| CN | 108012157 A | * | 5/2018 | ........... G06N 3/0454 |
| CN | 109151474 B | * | 10/2020 | ........... H04N 19/132 |
| WO | WO-2020043296 A1 | * | 3/2020 | ........... G06N 3/0454 |

OTHER PUBLICATIONS

"DeepBinaryMask_ Learning a binary mask for video compressive sensing" (Year: 2019).*

(Continued)

*Primary Examiner* — Mohammed Jebari
(74) *Attorney, Agent, or Firm* — Sughrue Mion, PLLC

(57) ABSTRACT

A method, computer program, and computer system is provided for encoding and decoding video data. Video data in a first resolution and a quality of the video data are received. One or more first weight coefficients of first layers a neural network and one or more binary masks for the one or more first weight coefficients are generated. One or more second weight coefficients of second layers of the neural network are generated based on the received quality of the video data. The video data is decoded in a second resolution by performing a convolution on the received video data in the first resolution using the generated one or more first weight coefficients that are masked by the generated one or more binary masks and using the generated one or more second weight coefficients.

17 Claims, 9 Drawing Sheets

(56) References Cited

OTHER PUBLICATIONS

LSHR-Net_ A hardware-friendly solution .. (Year: 2020).*
International Search Report dated Sep. 16, 2021 from the International Searching Authority in International Application No. PCT/US21/37397.
Written Opinion dated Sep. 16, 2021 from the International Bureau in International Application No. PCT/US21/37397.

* cited by examiner

MULTI-QUALITY VIDEO SUPER RESOLUTION WITH MICRO-STRUCTURED MASKS

CROSS-REFERENCE TO RELATED APPLICATION

This application claims priority from U.S. Provisional Patent Application No. 63/084,788 (filed Sep. 29, 2020) in the U.S. Patent and Trademark Office, which is herein incorporated by reference in its entirety.

FIELD

This disclosure relates generally to field of data processing, and more particularly to video encoding and decoding.

BACKGROUND

ISO/IEC JTC 1/SC 29 Working Groups have been actively searching for potential needs for standardization of future video coding technologies. ISO/IEC JPEG has established JPEG-AI group focusing on AI-based neural image compression using Deep Neural Networks (DNN). The Chinese AVS standard has also formed AVS-AI special group to work on neural image and video compression technologies. The success of AI technology and DNN in a large range of video applications such as semantic classification, target detection/recognition, target tracking, video quality enhancement, etc. poses a strong need for compressing the DNN models, and both MPEG and AVS are working on the Neural Network Compression standard (NNR), which compress DNN models to save both storage and computation. At the same time, with the increasing popularity of high-resolution (HR) display, such as 4K(3840×2160) and 8K(7680×4320) resolutions, video super resolution (SR) has drawn great attention in industry to generate the matching HR video content. Video SR aims at generating a high-resolution (HR) video from a corresponding low-resolution (LR) video, and it has wide applications in surveillance imaging, medical imaging, immersive experience, and so on.

SUMMARY

Embodiments relate to a method, system, and computer readable medium for video coding. According to one aspect, a method for video coding is provided. The method may include receiving video data in a first resolution and a quality of the video data. One or more first weight coefficients of first layers a neural network and one or more binary masks for the one or more first weight coefficients are generated. One or more second weight coefficients of second layers of the neural network are generated based on the received quality of the video data. The video data is decoded in a second resolution by performing a convolution on the received video data in the first resolution using the generated one or more first weight coefficients that are masked by the generated one or more binary masks and using the generated one or more second weight coefficients.

According to another aspect, a computer system for video coding is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving video data in a first resolution and a quality of the video data. One or more first weight coefficients of first layers a neural network and one or more binary masks for the one or more first weight coefficients are generated. One or more second weight coefficients of second layers of the neural network are generated based on the received quality of the video data. The video data is decoded in a second resolution by performing a convolution on the received video data in the first resolution using the generated one or more first weight coefficients that are masked by the generated one or more binary masks and using the generated one or more second weight coefficients.

According to yet another aspect, a computer readable medium for video coding is provided. The computer readable medium may include one or more computer-readable storage devices and program instructions stored on at least one of the one or more tangible storage devices, the program instructions executable by a processor. The program instructions are executable by a processor for performing a method that may accordingly include receiving video data in a first resolution and a quality of the video data. One or more first weight coefficients of first layers a neural network and one or more binary masks for the one or more first weight coefficients are generated. One or more second weight coefficients of second layers of the neural network are generated based on the received quality of the video data. The video data is decoded in a second resolution by performing a convolution on the received video data in the first resolution using the generated one or more first weight coefficients that are masked by the generated one or more binary masks and using the generated one or more second weight coefficients.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
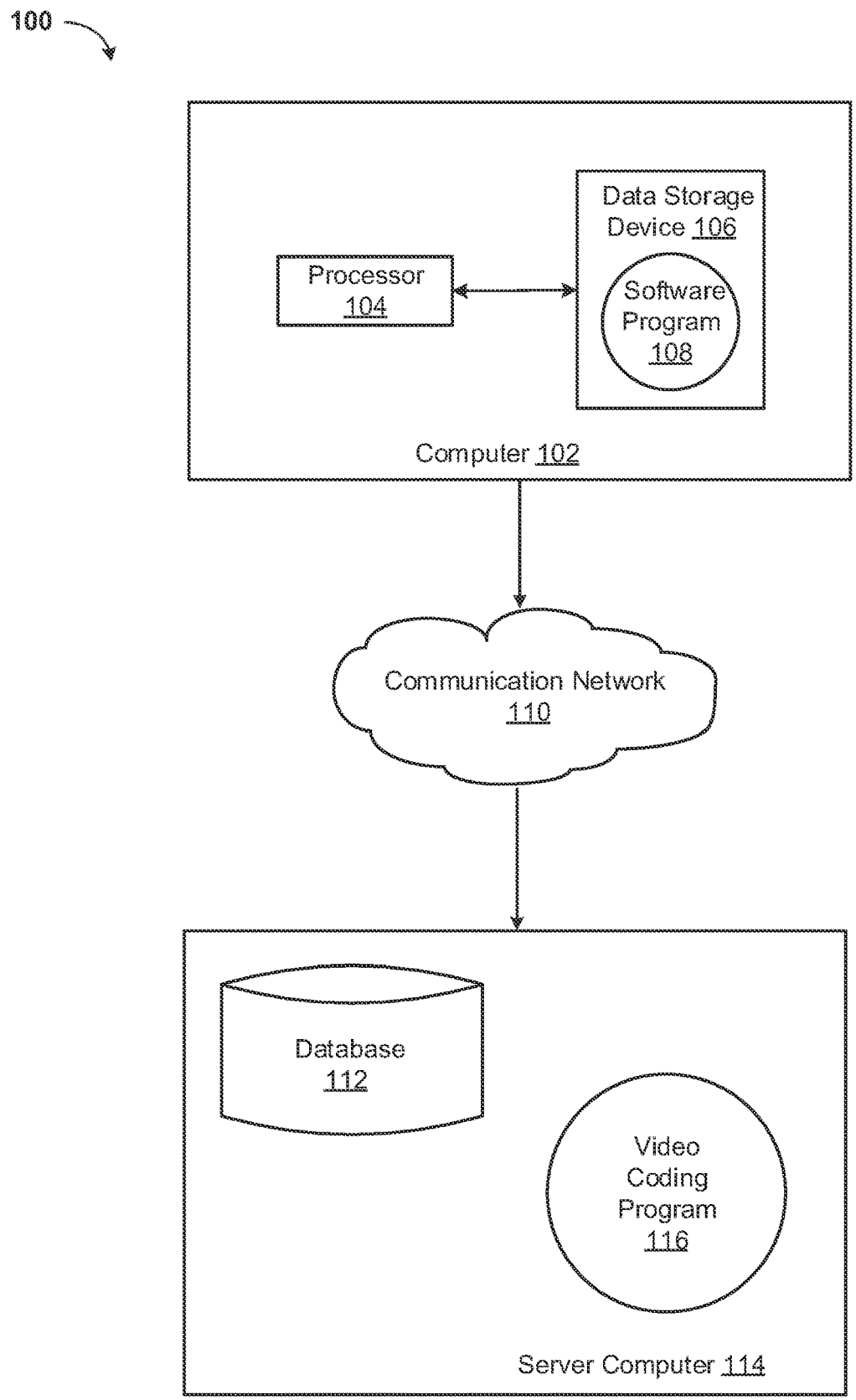
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, use a multi-quality video super-resolution framework, where only one model instance is used to achieve video super-resolution of input videos with multiple quality configurations. Therefore, some embodiments have the capacity to improve the field of computing by allowing for improved video encoding and decoding based on learning a set of binary masks for each targeted quality to guide the SR model instance to generate HR video from input LR video with different qualities.

As previously described, ISO/IEC JTC 1/SC 29 Working Groups have been actively searching for potential needs for standardization of future video coding technologies. ISO/IEC JPEG has established JPEG-AI group focusing on AI-based neural image compression using Deep Neural Networks (DNN). The Chinese AVS standard has also formed AVS-AI special group to work on neural image and video compression technologies. The success of AI technology and DNN in a large range of video applications such as semantic classification, target detection/recognition, target tracking, video quality enhancement, etc. poses a strong need for compressing the DNN models, and both MPEG and AVS are working on the Neural Network Compression standard (NNR), which compress DNN models to save both storage and computation. At the same time, with the increasing popularity of high-resolution (HR) display, such as 4K(3840×2160) and 8K(7680×4320) resolutions, video SR has drawn great attention in industry to generate the matching HR video content. Video SR aims at generating a high-resolution (HR) video from a corresponding low-resolution (LR) video, and it has wide applications in surveillance imaging, medical imaging, immersive experience, and so on.

However, in real-world scenarios, it is necessary for an SR system to zoom in the LR video with various qualities tailored to different users. For example, due to the limitation of the network transmission speed, the end user's SR system may need to deal with videos of different compression qualities. Video SR has achieved great success due to the recent development of DNNs. One general issue of DNN-based video SR methods is the that a model trained for data following a certain data distribution cannot perform well on data following another data distribution. For example, SR models trained for processing HD videos with little compression cannot perform well for highly compressed videos with noticeable compression artifacts. For each quality of videos, traditional SR methods need to train an SR model instance with corresponding data individually. As a result, all these model instances need to be stored and deployed by end users, which is too expensive to be practical, especially for scenarios with limited storage and computation resources like mobile devices.

It may be advantageous, therefore, to use a multi-quality video super-resolution framework, where only one model instance is used to achieve video super-resolution of input videos with multiple quality configurations, with the guidance from multiple binary micro-structured masks. This may allow for largely reduced deployment storage to achieve SR for videos with multiple qualities. A flexible and general framework may be used that accommodates various types of underlying video SR models. Micro-structured masks may provide an additional benefit of computation reduction.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that uses a multi-quality SR framework for learning and deploying only one SR model instance to support SR of input video with multiple qualities. Referring now to FIG. 1, a functional block diagram of a networked computer environment illustrating a SR video system 100 (hereinafter "system") for video encoding and decoding. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 5 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for video coding is enabled to run a Video Coding Program 116 (hereinafter "program") that may interact with a database 112. The Video Coding Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video coding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2A:
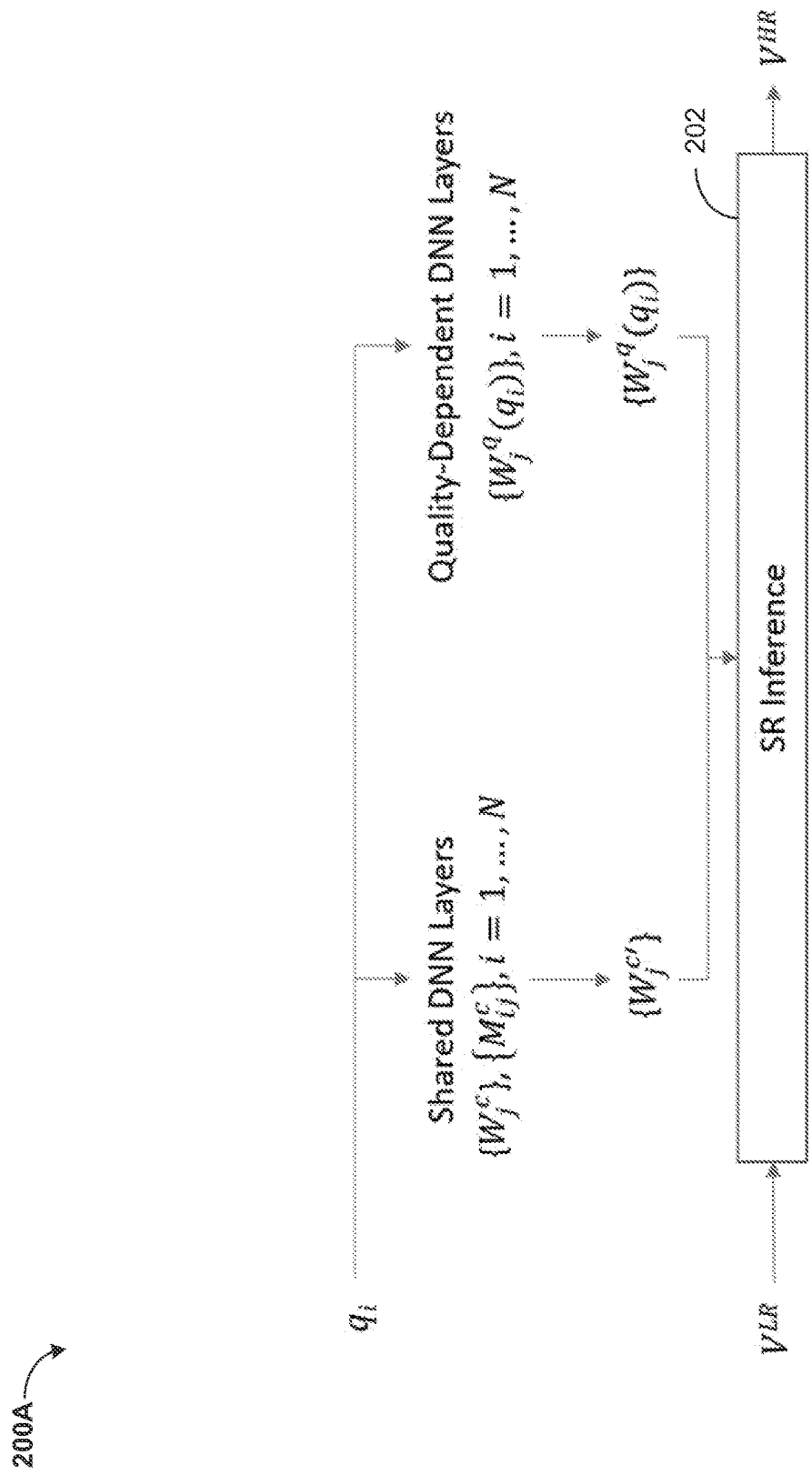
FIG. 2A is a block diagram of a workflow of a test stage of an SR framework, according to at least one embodiment.

Referring now to FIG. 2A, a block diagram of the workflow 200A of the test stage of the SR framework is depicted. The workflow 200A may include, among other things, an SR Inference module 202. Given an input video $V^{LR}$ of size (t,h,w,c), where t, h, w, c are the length (number of frames), height, width, and number of channels, respectively. Assume a set of Q quality of interests for the input video $q_1, \ldots, q_N$. The quality of the video can be determined by several factors such as resolution, noises, motion blur, compression artifacts etc. Each quality $q_i$ can be a single value aggregating all factors or a configuration of these factors. The overall SR model is an DNN that can be separated into two parts: a set of Shared DNN Layers and a set of Quality-Dependent DNN Layers. The set of Shared DNN Layers contains DNN weight coefficients that are shared to compute different SR videos for input videos with different qualities. The set of Quality-Dependent DNN Layers contains DNN weight coefficients that are unique for computing SR videos for input videos with each predefined video quality. The set of Shared DNN Layers usually has a much larger number of parameters (e.g., 10×) than the set of Quality-Dependent DNN Layers. Weight coefficients of the DNN may be processed in a layer-based fashion. Let $\{W_j^c\}$ denote the weight parameters of the set of Shared DNN Layers, where each $W_j^c$ is the weight coefficients of the j-th layer. Let $\{M_{ij}^c\}$ denote a set of binary masks corresponding to the quality $q_i$, where each $M_{ij}^c$ has the same shape as $W_j^c$, and each entry of $M_{ij}^c$ is 1 or 0 indicating whether or not the corresponding weight entry in $W_j^c$ participates in the inference computation for generating the SR result for input videos with quality $q_i$. The set of Quality-Dependent DNN Layers can be seen as coming from several lightweight subnetworks, one subnetwork for each quality $q_i$, and for each input video, the corresponding subnetwork is used for generating the SR video of its corresponding quality. Let $\{W_j^q(q_i)\}$ denote a set of weight coefficients of the subnetwork of the set of Quality-Dependent DNN Layers corresponding to quality $q_i$, where each $W_j^q(q_i)$ is the weight coefficients of the j-th layer.

Each weight coefficients $W_j^c$ or $W_j^q(q_i)$ is a general 5-Dimension (5D) tensor with size $(c_1, k_1, k_2, k_3, c_2)$. The input of the layer is a 4-Dimension (4D) tensor A of size $(h_1, w_1, d_1, c_1)$, and the output of the layer is a 4D tensor B of size $(h_2, w_2, d_2, c_2)$. The sizes $c_1, k_1, k_2, k_3, c_2, h_1, w_1, d_1, h_2, w_2, d_2$ are integer numbers greater or equal to 1. When any of the sizes $c_1, k_1, k_2, k_3, c_2, h_1, w_1, d, h_2, w_2, d_2$ takes number 1, the corresponding tensor reduces to a lower dimension. Each item in each tensor is a floating number. The parameters $h_1, w_1$ and $d_1$ ($h_2, w_2$ and $d_2$) are the height, weight and depth of the input tensor A (output tensor B). The parameter $c_1$ ($c_2$) is the number of input (output) channel. The parameters $k_1, k_2$ and $k_3$ are the size of the convolution kernel corresponding to the height, weight and depth axes, respectively. The output B is computed through the convolution operation 0 based on input A, weight $W_i^c$ or $W_i^q(q_i)$, and mask $M_{ij}^c$ if available (note that for $W_j^q(q_i)$, a mask $M_j^q(q_i)$ may be associated with it, and all entries of $M_j^q(q_i)$ are set to be 1). B may be computed as A convolving with masked weights $W_{ij}^{c'}=W_j^c$. $M_{ij}^c$ or $W_j^{q'}(q_i)=W_j^q(q_i) \cdot M_j^q(q_i)=W_j^q(q_i)$, where · is element-wise multiplication. Given the above mentioned learned weight coefficients $\{W_j^c\}$, $\{W_j^q(q_i), i=1, \ldots, N\}$, and masks $\{M_{ij}^c\}, i=1, \ldots, N$, the test stage may be described. Given the input LR video $V^{LR}$ and the corresponding quality $q_i$, the corresponding masks $\{M_{ij}^c\}$ is used to generate the masked weight coefficients $\{W_{ij}^{c'}\}$ for the Shared DNN Layers, and the corresponding subnetwork parameters $W_j^q(q_i)$ of the Quality-Dependent DNN Layers for quality $q_i$ are selected. Then using the masked weight coefficients $\{W_{ij}^{c'}\}$ for the Shared DNN Layers and the selected $W_j^q(q_i)$ for the Quality-Dependent DNN Layers, the input video is passed through the SR model by the SR Inference module 202 to compute the HR video $V^{HR}$.

Figure 2B:
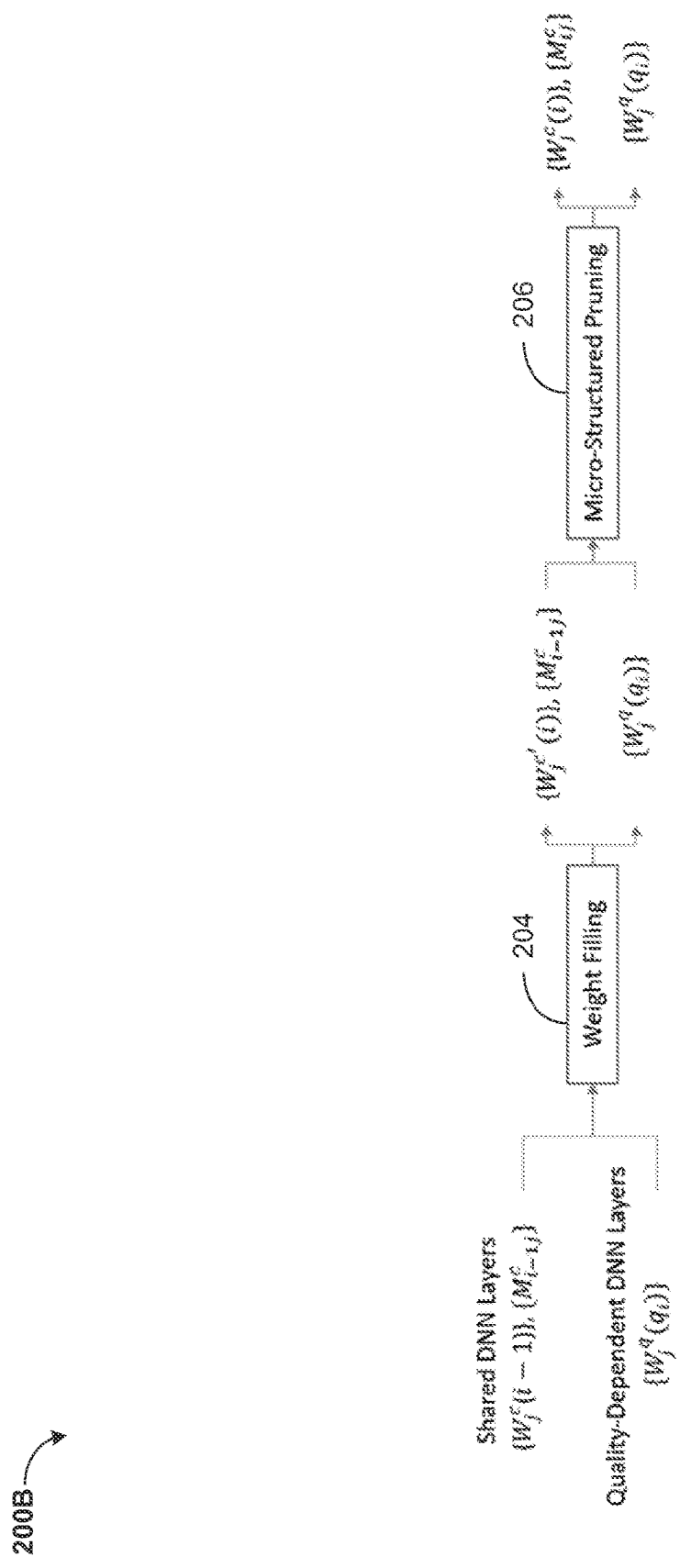
FIG. 2B is a block diagram of a workflow of a multi-stage training framework, according to at least one embodiment.

Referring now to FIG. 2B, a block diagram of a workflow of a multi-stage training framework 200B is depicted. The workflow 200B may include, among other things, a Weight Filling module 204 and a Micro-Structured Pruning module 206. The shape of each $W_j^c$ (so as each mask $M_{ij}^c$) can be changed, corresponding to the convolution of a reshaped input with the reshaped $W_j^c$ to obtain the same output. Two configurations may be used. (1) The 5D weight tensor is reshaped into a 3D tensor of size ($c_1'$, $c_2'$, k), where $c_1' \times c_2' \times k = c_1 \times c_2 \times k_1 \times k_2 \times k_3$. For example, one configuration is $c=c_1'$, $c_2'=c_2$, $k=k_1 \times k_2 \times k_3$. (2) The 5D weight tensor is reshaped into a 2D matrix of size ($c_1'$, $c_2'$), where $c_1' \times c_2' = c_1 \times c_2 \times k_1 \times k_2 \times k_3$. For example, some configurations are $c=c_1'$, $c_2'=c_2 \times k_1 \times k_2 \times k_3$, or $c_2'=c_2$, $c_1'=c_1 \times k_1 \times k_2 \times k_3$.

The desired micro-structure of the masks may be designed to align with the underlying GEMM matrix multiplication process of how the convolution operation is implemented so that the inference computation of using the masked weight coefficients can be accelerated. Block-wise micro-structures may be used for the masks (so as the masked weight coefficients) of each layer in the 3D reshaped weight tensor or the 2D reshaped weight matrix. Specifically, for the case of reshaped 3D weight tensor, it may be partitioned into blocks of size ($g_i$, $g_o$, $g_k$), and for the case of reshaped 2D weight matrix, it may be partitioned into blocks of size ($g_i$, $g_o$). All items in a block of a mask will have the same binary value 1 or 0. That is, weight coefficients are masked out in the block-wise micro-structured fashion. The model instance with weights $\{W_j^c\}$ and $\{W_j^q(q_i)\}$ and the set of micro-structured masks $\{M_{ij}^c\}$, for i=1, ..., N may be learned for each $\{M_{ij}^c\}$ and $\{W_j^q(q_i)\}$, targeting at each video quality of interest $q_i$.

Without loss of generality, assume that the N qualities $q_1, \ldots q_N$ are ranked in descending order. That is, $q_1$ is the best quality and $q_N$ is the worse quality. To train the masks targeting at $q_i$, the current model instance with weights $\{W_j^c(i-1)\}$ and the corresponding masks $\{M_{i-1j}^c\}$ may be used. For the current quality $q_i$, the corresponding Quality-Dependent DNN parameters $\{W_j^q(q_i)\}$ may be learned to obtain masks $\{M_{ij}^c\}$ and the updated weight coefficients $\{W_j^c(i)\}$ and the new weight coefficients $\{W_j^q(q_i)\}$. Weight coefficients in $\{W_j^c(i-1)\}$ that are masked by $\{M_{i-1j}^c\}$ may be fixed. For example, if an entry in $M_{i-1j}^c$ is 1, the corresponding weight in $W_j^c(i-1)$ will be fixed. The remaining weight coefficients corresponding to 0 entries in $M_{i-1j}^c$ have 0 values. A learning process may be conducted to fill up these unfixed zero-valued weights for the Shared DNN Layers and the weights $\{W_j^q(q_i)\}$ for the Quality-Dependent Layers, through the Weight Filling module 204. This results in a set of updated weight coefficients $\{W_j^{c'}(i)\}$ and $\{W_j^q(q_i)\}$. Then based on $\{W_j^{c'}(i)\}$, $\{M_{i-1j}^c\}$, and $\{W_j^q(q_i)\}$, micro-structured pruning may be conducted through the Micro-Structured Pruning module 206 to obtain the model instance and masks $\{W_j^c(i)\},\{M_{ij}^c\},\{W_j^q(q_i)\}$.

Figure 3A:
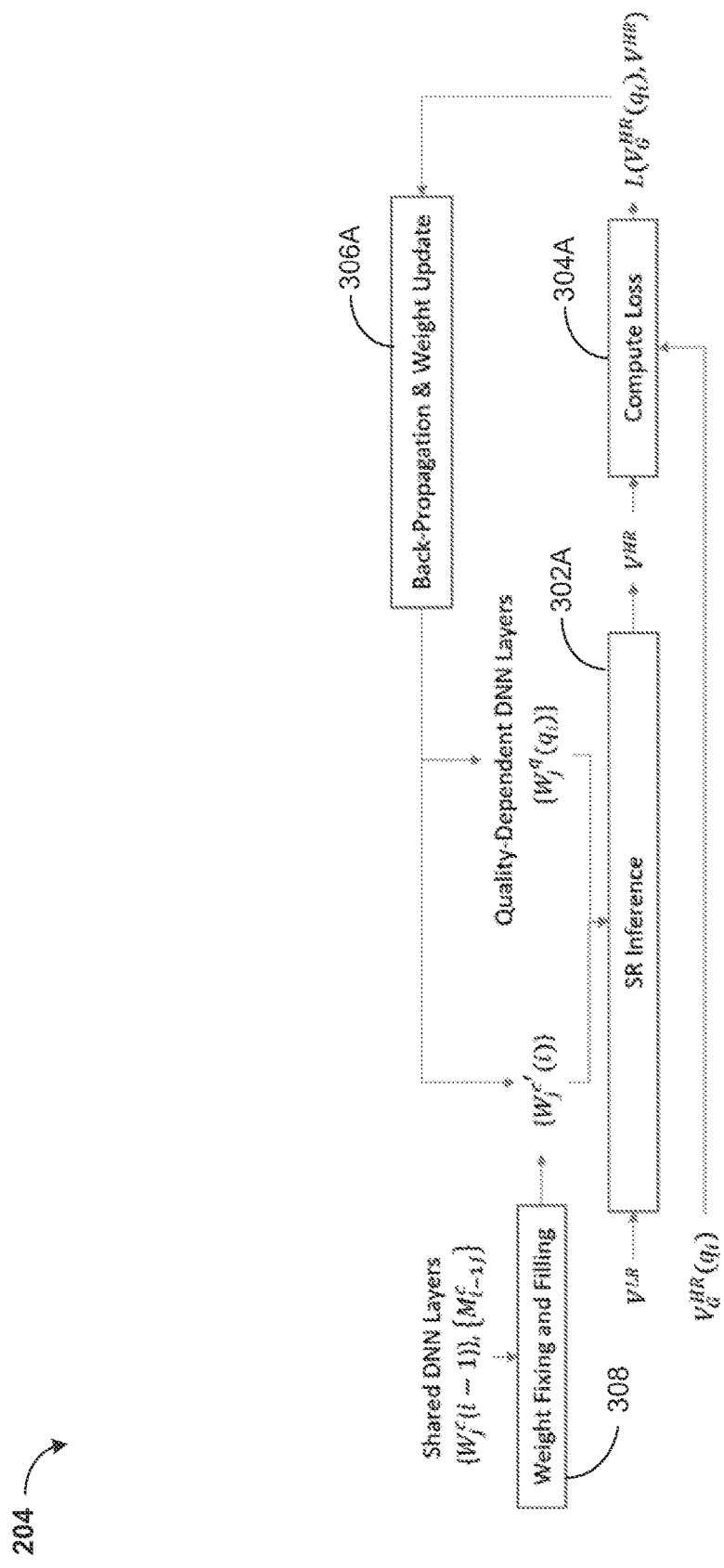
FIG. 3A is a block diagram of a workflow of a weight filling module, according to at least one embodiment.

Referring now to FIG. 3A, a block diagram of the detailed workflow of the Weight Filling module 204 of FIG. 2B is depicted. The workflow may include, among other things, the SR Inference module 302A, a Compute Loss module 304A, a Back-Propagation & Weight Update module 306A, and a Weight Fixing and Filling module 308. The SR Inference module 302A may be similar to the SR Inference module 202 as described above in FIG. 2A Given the current weights $\{W_j^c(i-1)\}$ and the corresponding masks $\{M_{i-1j}^c\}$, in the Weight Fixing and Filling module 308, weight coefficients in $\{W_j^c(i-1)\}$ that are masked by $\{M_{i-1j}^c\}$ may be fixed, and the remaining weight coefficients in $\{W_j^c(i-1)\}$ that have zero values may be reinitialized by setting them to some randomly initial values or using the corresponding weights of a previously learned full model such as the first full model with weights $\{W_j^{c'}(0)\}$. This gives the weight coefficients $\{W_j^{c'}(i)\}$ for the Shared DNN Layers. Also, the weights $\{W_j^q(q_i)\}$ of the Quality-Dependent DNN Layers are initialized (e.g., by setting them to some randomly initialized value or using the corresponding weights of some previously learned full model such as an individual full model trained for the current quality $q_i$). After that, using $\{W_j^{c'}(i)\}$ and $\{W_j^q(q_i)\}$, the training input video $V^{LR}$ is passed through the SR DNN to compute the HR video $V^{HR}$ in the SR Inference module 202. For the training purpose, each training input LR video $V^{LR}$ has a corresponding ground-truth HR video $V_G^{HR}(q_i)$ for the current quality $q_i$. The general goal of training is to minimize the distortion between the ground-truth video $V_G^{HR}(q_i)$ and the estimated HR video $V^{HR}$. A distortion loss $L(V_G^{HR}(q_i), V^{HR})$ can be computed to measure the distortion in the Compute Loss module, such as the $L_1$ or $L_2$ norm of the difference between $V_G^{HR}(q_i)$ and $V^{HR}$. The gradient of this loss can be computed to update the unfixed weight coefficients in $\{W_j^{c'}(i)\}$ of the Shared DNN Layers and the weight coefficients $\{W_j^q(q_i)\}$ of the Quality-Dependent DNN Layers in the Back-Propagation & Weight Update module. Typical, multiple epoch iterations will be taken to optimize the loss $L(V_G^{HR}(q_i), V^{HR})$ in this Back-Propagation & Weight Update module, e.g., until reaching a maximum iteration number or until the loss converges.

Figure 3B:
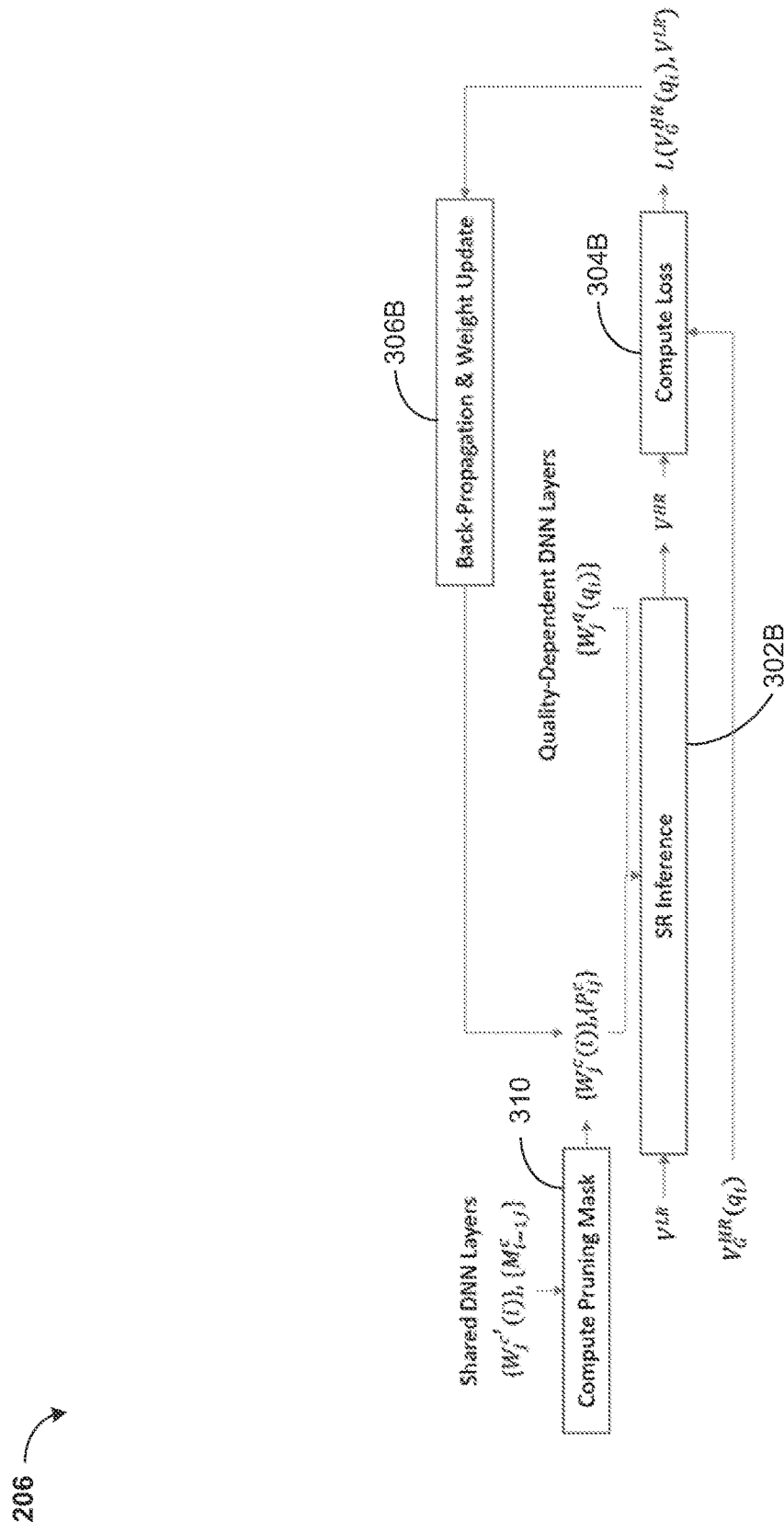
FIG. 3B is a block diagram of a workflow of a micro-structured pruning module, according to at least one embodiment.

Referring now to FIG. 3B, the detailed workflow of the Micro-Structured Pruning module 206 of FIG. 2B is depicted. The workflow may include, among other things, the SR Inference module 302A, a Compute Loss module 304A, a Back-Propagation & Weight Update module 306A, and a Compute Pruning Mask module 310. Given the updated weights $\{W_j^{c'}(i)\}$ of the Shared DNN Layers and $\{W_j^q(q_i)\}$ of the Quality-Dependent DNN Layers from the above Weight Filling module 204, as well as the current masks $\{M_{i-1j}^c\}$, the pruning masks $\{M_{ij}^c\}$ may be computed by the Compute Pruning Mask module 310.

Specifically, the weight coefficients in $\{W_j^{c'}(i)\}$ that are masked by $\{M_{i-1j}^c\}$ may be fixed, and for the remaining unfixed weight coefficients in $\{W_j^{c'}(i)\}$, a pruning loss $L_p(b)$ may be computed (e.g., the $L_1$ or $L_2$ norm of the weights in the block) for each micro-structured block b (3D block for 3D reshaped weight tensor or 2D block for 2D reshaped weight matrix). These micro-structured blocks may be ranked based on their pruning loss in ascending order and prune the blocks (i.e., by setting the corresponding weights in the pruned blocks as 0) top down from the ranked list until a stop criterion may be reached. For example, given a validation dataset $S_{val}$, the SR model with weights $\{W_j^{c'}(i)\}$ and $\{W_j^q(q_i)\}$ can generate a distortion loss $L_{val} = \Sigma_{V_G^{HR}(q_i) \in S_{val}} L(V_G^{HR}(q_i), V^{HR})$. As more and more micro-blocks are pruned, this distortion loss will gradually increase. The stop criterion can be a tolerable percentage threshold to allow the distortion loss to increase. The stop criterion can also be a simple percentage (e.g., 50%) of the micro-structured blocks to prune. A set of binary pruning masks $\{P_{ij}^c\}$ can be generated, where an entry in a mask $P_{ij}^c$ is 1 means the corresponding weight in $W_j^{c'}(i)$ is pruned. Then the additional unfixed weights in $W_j^{c'}(i)$ that are masked by $\{P_{ij}^c\}$ may be fixed as being pruned. The remaining weights in $W_j^{c'}(i)$ that are not masked by either $\{P_{ij}^c\}$ or $\{M_{i-1j}^c\}$ may be updated. The weights $\{W_j^q(q_i)\}$ may be updated by regular back-propagation to optimize the distortion loss $L(V_G^{HR}(q_i), V^{HR})$ over the training data. Typical, multiple epoch iterations will be taken to optimize the distortion loss in this back propagation and weight update process, e.g., until reaching a maximum iteration number or until the loss converges.

The corresponding masks $\{M_{ij}^c\}$ can be computed as $M_{ij}^c = M_{i-1j}^c \cup P_{ij}^c$. That is, the non-pruned entries in $P_{ij}^c$ that are not masked in $M_{i-1j}^c$ will be additionally set to 1 as being masked in $M_{ij}^c$. Also, the above Micro-Structured Weight Pruning process will output the updated weights $\{W_j^c(i)\}$ and $\{W_j^q(q_i)\}$. Note that the above micro-structured pruning process can also be applied to $\{W_j^q(q_i)\}$ optionally, to further reduce the model size and inference computation. That is, in the Compute Pruning Mask module 310, weights of the Quality-Dependent DNN Layers can be reshaped and partitioned to micro-structures. The pruning loss of those micro-structures may be computed, and top ranked micro-structures may be pruned with small pruning loss. This may be a tradeoff between reducing the SR distortion and saving storage and computation. Finally, the last updated weights $\{W_j^c(N)\}$ are the final output weights $\{W_j^c\}$ for the Shared DNN Layers of the learned model instance.

Figure 4:
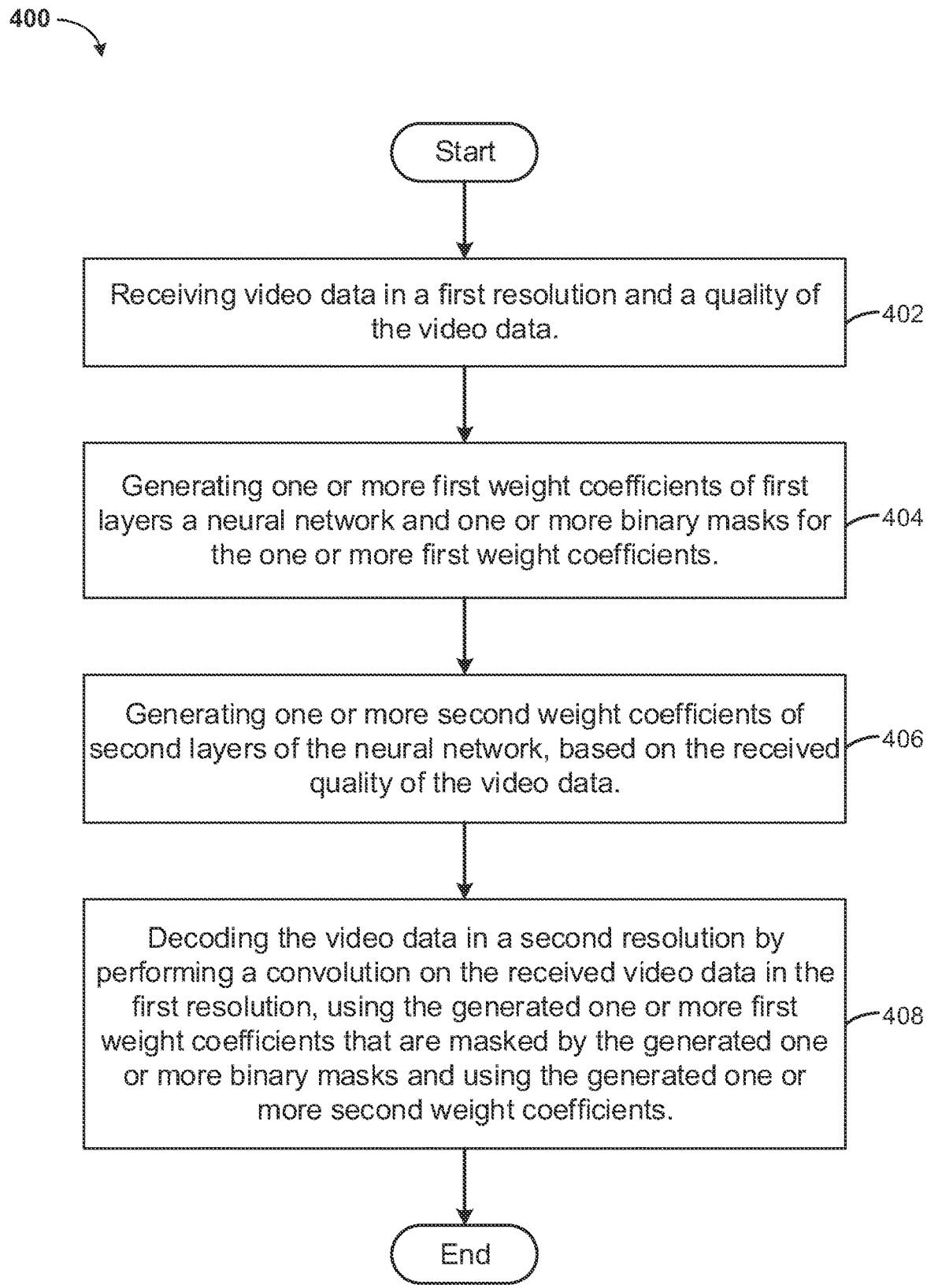
FIG. 4 is an operational flowchart illustrating the steps carried out by a program that encodes and decodes video based on SR, according to at least one embodiment.

Referring now to FIG. 4, an operational flowchart illustrating the steps of a method 400 carried out by a program for video coding is depicted.

At 402, the method 400 may include receiving video data in a first resolution and a quality of the video data.

At 404, the method 400 may include generating one or more first weight coefficients of first layers a neural network and one or more binary masks for the one or more first weight coefficients.

At 406, the method 400 may include generating one or more second weight coefficients of second layers of the neural network, based on the received quality of the video data.

At 408, the method 400 may include decoding the video data in a second resolution by performing a convolution on the received video data in the first resolution, using the generated one or more first weight coefficients that are masked by the generated one or more binary masks and using the generated one or more second weight coefficients.

It may be appreciated that FIG. 4 provides only an illustration of one implementation and does not imply any limitations with regard to how different embodiments may be implemented. Many modifications to the depicted environments may be made based on design and implementation requirements.

Figure 5:
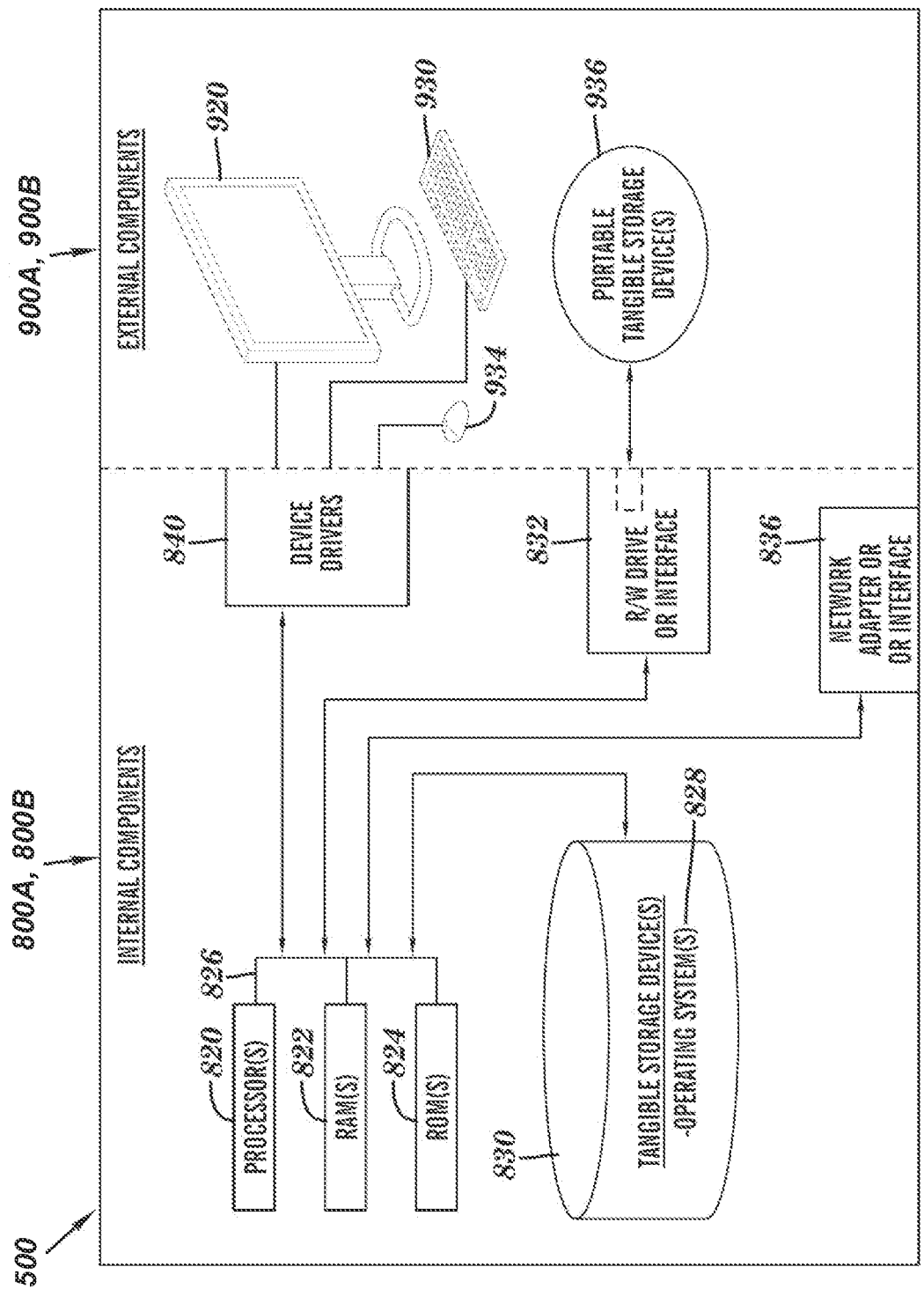
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Coding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Coding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Coding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Coding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
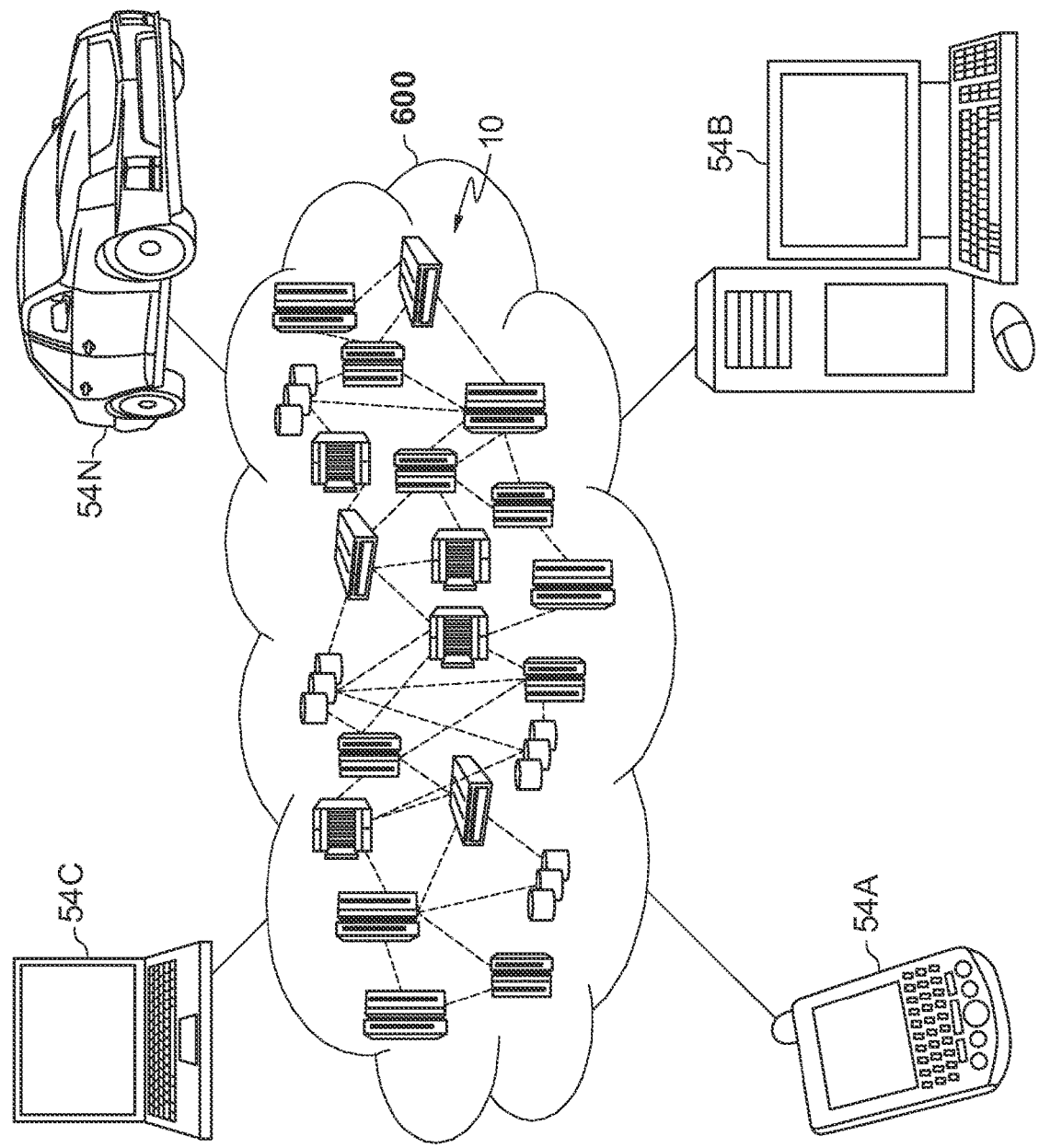
FIG. 6 is a block diagram of an illustrative cloud computing environment including the computer system depicted in FIG. 1, according to at least one embodiment.

Referring to FIG. 6, illustrative cloud computing environment 600 is depicted. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 600 can communicate with any type of computerized device over any type of network and/or network addressable connection (e.g., using a web browser).

Figure 7:
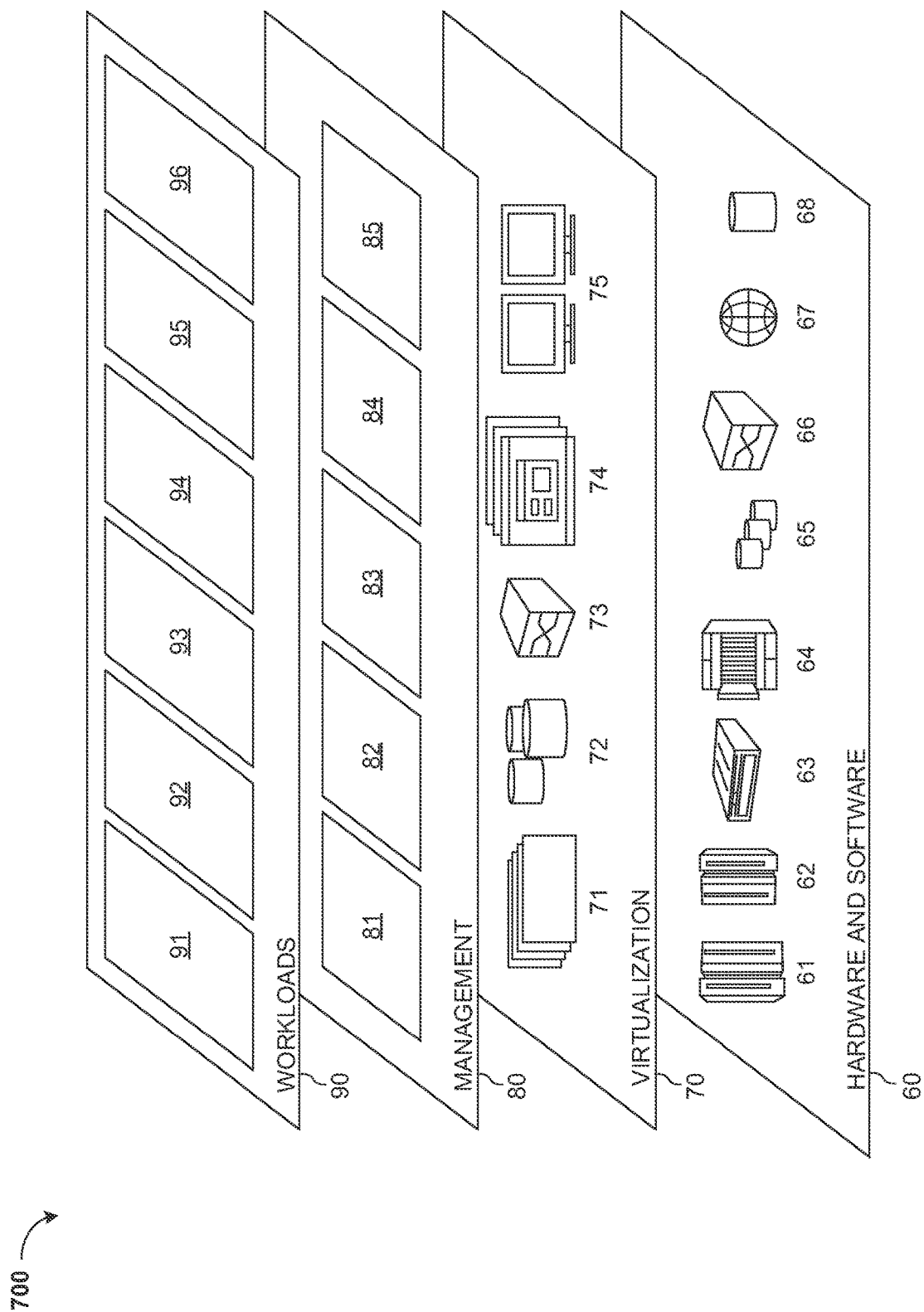
FIG. 7 is a block diagram of functional layers of the illustrative cloud computing environment of FIG. 6, according to at least one embodiment.

Referring to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Coding 96. Video Coding 96 may code video data based on using a multi-quality video super-resolution framework, where only one model instance is used to achieve video super-resolution of input videos with multiple quality configurations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of coding video data, executable by a processor, comprising:
receiving video data in a first resolution and a quality, among a plurality of qualities, of the video data;
generating one or more first weight coefficients of first layers of a neural network and one or more binary masks for the one or more first weight coefficients;
generating one or more second weight coefficients of second layers of the neural network, based on the received quality of the video data; and
decoding the video data in a second resolution by performing a convolution operation on the received video data in the first resolution, based on an inference computation using the generated one or more first weight coefficients that are masked by the generated one or more binary masks and using the generated one or more second weight coefficients,
wherein a structure of the one or more binary masks corresponds to a matrix multiplication process based on the convolution operation, and
wherein a respective set of the one or more binary masks is generated for each quality of the plurality of qualities, and in a set of the one or more binary masks corresponding to a given quality, each entry of the one or more binary masks is 1 or 0 indicating whether or not a corresponding weight entry in a set of the one or more first weight coefficients for the given quality participates in the inference computation for generating the video data in the second resolution for an input video with the given quality.

2. The method of claim 1, wherein the second resolution is higher than the first resolution.

3. The method of claim 1, wherein the one or more binary masks include block-wise micro-structures based on 3D reshaped weight tensor or a 2D reshaped weight matrix.

4. The method of claim 3, wherein all elements of the weight tensor or weight matrix have a same binary value of zero or 1.

5. The method of claim 1, wherein the neural network is trained by:
determining a distortion loss based on a difference between the video data in the second resolution and a ground-truth video data in the first resolution; and
updating the generated one or more first weight coefficients and the generated one or more second weight coefficients, to minimize the determined distortion loss.

6. The method of claim 5, wherein the neural network is further trained by:
determining a pruning loss for the generated one or more first weight coefficients that are not masked by the generated one or more binary masks;
pruning the one or more first weight coefficients not masked by the one or more binary masks, based on the determined pruning loss; and
updating the pruned one or more first weight coefficients not masked by the one or more binary masks, to minimize the determined pruning loss.

7. A computer system for video coding, the computer system comprising:
one or more computer-readable non-transitory storage media configured to store computer program code; and
one or more computer processors configured to access said computer program code and operate as instructed by said computer program code, said computer program code including:
receiving code configured to cause the one or more computer processors to receive video data in a first resolution and a quality, among a plurality of qualities, of the video data;
first generating code configured to cause the one or more computer processors to generate one or more first weight coefficients of first layers of a neural network and one or more binary masks for the one or more first weight coefficients;

second generating code configured to cause the one or more computer processors to generate one or more second weight coefficients of second layers of the neural network, based on the received quality of the video data; and decoding code configured to cause the one or more computer processors to decode the video data in a second resolution by performing a convolution operation on the received video data in the first resolution, based on an inference computation using the generated one or more first weight coefficients that are masked by the generated one or more binary masks and using the generated one or more second weight coefficients, wherein a structure of the one or more binary masks corresponds to a matrix multiplication process based on the convolution operation, and wherein a respective set of the one or more binary masks is generated for each quality of the plurality of qualities, and in a set of the one or more binary masks corresponding to a given quality, each entry of the one or more binary masks is 1 or 0 indicating whether or not a corresponding weight entry in a set of the one or more first weight coefficients for the given quality participates in the inference computation for generating the video data in the second resolution for an input video with the given quality.

8. The computer system of claim 7, wherein the second resolution is higher than the first resolution.

9. The computer system of claim 7, wherein the one or more binary masks include block-wise micro-structures based on 3D reshaped weight tensor or a 2D reshaped weight matrix.

10. The computer system of claim 9, wherein all elements of the weight tensor or weight matrix have a same binary value of zero or 1.

11. The computer system of claim 7, wherein the neural network is trained by:
determining a distortion loss based on a difference between the video data in the second resolution and a ground-truth video data in the first resolution; and
updating the generated one or more first weight coefficients and the generated one or more second weight coefficients, to minimize the determined distortion loss.

12. The computer system of claim 11, wherein the neural network is further trained by:
determining a pruning loss for the generated one or more first weight coefficients that are not masked by the generated one or more binary masks;
pruning the one or more first weight coefficients not masked by the one or more binary masks, based on the determined pruning loss; and
updating the pruned one or more first weight coefficients not masked by the one or more binary masks, to minimize the determined pruning loss.

13. A non-transitory computer readable medium having stored thereon a computer program for video coding, the computer program configured to cause one or more computer processors to:
receive video data in a first resolution and a quality, among a plurality of qualities, of the video data;
generate one or more first weight coefficients of first layers of a neural network and one or more binary masks for the one or more first weight coefficients;
generate one or more second weight coefficients of second layers of the neural network, based on the received quality of the video data; and
decode the video data in a second resolution by performing a convolution operation on the received video data in the first resolution, based on an inference computation using the generated one or more first weight coefficients that are masked by the generated one or more binary masks and using the generated one or more second weight coefficients,
wherein a structure of the one or more binary masks corresponds to a matrix multiplication process based on the convolution operation, and
wherein a respective set of the one or more binary masks is generated for each quality of the plurality of qualities, and in a set of the one or more binary masks corresponding to a given quality, each entry of the one or more binary masks is 1 or 0 indicating whether or not a corresponding weight entry in a set of the one or more first weight coefficients for the given quality participates in the inference computation for generating the video data in the second resolution for an input video with the given quality.

14. The computer readable medium of claim 13, wherein the second resolution is higher than the first resolution.

15. The computer readable medium of claim 13, wherein the one or more binary masks include block-wise micro-structures based on 3D reshaped weight tensor or a 2D reshaped weight matrix.

16. The computer readable medium of claim 13, wherein the neural network is trained by:
determining a distortion loss based on a difference between the video data in the second resolution and a ground-truth video data in the first resolution; and
updating the generated one or more first weight coefficients and the generated one or more second weight coefficients, to minimize the determined distortion loss.

17. The computer readable medium of claim 16, wherein the neural network is further trained by:
determining a pruning loss for the generated one or more first weight coefficients that are not masked by the generated one or more binary masks;
pruning the one or more first weight coefficients not masked by the one or more binary masks, based on the determined pruning loss; and
updating the pruned one or more first weight coefficients not masked by the one or more binary masks, to minimize the determined pruning loss.

* * * * *